United States Patent
Cocchi et al.

(10) Patent No.: US 9,462,826 B2
(45) Date of Patent: Oct. 11, 2016

(54) MACHINE FOR PROCESSING AND KEEPING ICE CREAM, SLUSH DRINKS AND SIMILAR PRODUCTS

(71) Applicant: ALI S.p.A.—CARPIGIANI GROUP, Milan (IT)

(72) Inventors: Andrea Cocchi, Calderara di Reno (IT); Roberto Lazzarini, Reggio Emilia (IT)

(73) Assignee: ALI S.p.A.—CARPIGIANI GROUP, Milan (IT)

( * ) Notice: Subject to any disclaimer, the term of this patent is extended or adjusted under 35 U.S.C. 154(b) by 114 days.

(21) Appl. No.: 13/856,209

(22) Filed: Apr. 3, 2013

(65) Prior Publication Data

US 2013/0269381 A1    Oct. 17, 2013

(30) Foreign Application Priority Data

Apr. 12, 2012  (IT) .............................. BO2012A0196

(51) Int. Cl.

| | |
|---|---|
| *A23G 9/04* | (2006.01) |
| *A23L 3/36* | (2006.01) |
| *F25B 5/00* | (2006.01) |
| *F25B 30/00* | (2006.01) |
| *F25B 5/02* | (2006.01) |
| *A23G 9/22* | (2006.01) |
| *A47F 3/04* | (2006.01) |

(52) U.S. Cl.
CPC .................. *A23L 3/36* (2013.01); *A23G 9/045* (2013.01); *A23G 9/222* (2013.01); *A23G 9/225* (2013.01); *A47F 3/04* (2013.01)

(58) Field of Classification Search
CPC  A23G 9/04; A23G 9/045; F25B 2313/0232; F25B 2313/02321; F25B 2313/02322; F25B 2313/02331; F25B 2313/02332; F25B 5/00; F25B 7/00; A23L 3/36

See application file for complete search history.

(56) References Cited

U.S. PATENT DOCUMENTS

| | | | |
|---|---|---|---|
| 5,050,396 A    * | 9/1991 | Ohkoshi et al. ................ | 62/160 |
| 2004/0083754 A1* | 5/2004 | Cocchi et al. .................. | 62/354 |

(Continued)

FOREIGN PATENT DOCUMENTS

| | | |
|---|---|---|
| IT | 1787525 | 5/2007 |
| WO | 2010/049956 | 5/2010 |

OTHER PUBLICATIONS

Italian Search Report dated Jan. 15, 2013 from counterpart application.

*Primary Examiner* — Frantz Jules
*Assistant Examiner* — Erik Mendoza-Wilkenfe
(74) *Attorney, Agent, or Firm* — Shuttleworth & Ingersoll, PLC; Timothy J. Klima

(57) ABSTRACT

A machine for processing and keeping ice cream, slush drinks and similar products, comprises a display counter comprising, a plurality of visible mixing and freezing cylinders for processing basic products and keeping ice cream, and a cooling circuit which allows the temperature of the basic products and of the ice cream to be adjusted; the cooling circuit is equipped with a first refrigerating circuit and a second heating circuit having respective offtake branches dedicated to each of the mixing and freezing cylinders and designed to maintain the temperature for processing the basic product at the same temperature for keeping the ice cream.

6 Claims, 3 Drawing Sheets

(56) References Cited

U.S. PATENT DOCUMENTS

| | | | |
|---|---|---|---|
| 2006/0090487 A1* | 5/2006 | Park et al. | 62/160 |
| 2007/0119196 A1* | 5/2007 | Wellman | F25B 47/022 62/151 |
| 2008/0092580 A1 | 4/2008 | Mavridis et al. | |
| 2011/0217440 A1* | 9/2011 | Grotti | 426/519 |
| 2011/0297363 A1* | 12/2011 | Takata et al. | 165/270 |
| 2012/0055189 A1 | 3/2012 | Sipp et al. | |

\* cited by examiner

MACHINE FOR PROCESSING AND KEEPING ICE CREAM, SLUSH DRINKS AND SIMILAR PRODUCTS

This application claims priority to Italian Patent Application BO2012A000196 filed Apr. 12, 2012, the entirety of which is incorporated by reference herein.

BACKGROUND OF THE INVENTION

This invention relates to a machine for processing and keeping ice cream, slush drinks and similar products.

More specifically, the invention relates to machines designed to process ice cream of the type known as gelato, which is made and dispensed to consumers in artisanal gelato parlors and stalls.

These machines comprise a display counter with a plurality of visible mixing and freezing cylinders for processing the ice cream, so that the consumer has a first-hand view of the ice cream production process, from mixing and freezing to storage.

A cooling circuit serves the mixing and freezing cylinders on display in the counter so as to adjust and maintain the temperature at which the basic products and the ice cream are processed and kept.

Prior art cooling circuits, however, are extremely complex in terms both of their structure and functioning, which has led to their becoming obsolete in present-day systems.

SUMMARY OF THE INVENTION

The aim of this invention is to provide a machine for processing and keeping ice cream, slush drinks and similar products, equipped with a cooling system which is structurally and functionally simple and which, moreover, is inexpensive. The technical purpose indicated and the aims specified are substantially achieved by a machine comprising the technical features described herein.

BRIEF DESCRIPTION OF THE DRAWINGS

Further features and advantages of this invention are more apparent in the detailed description below, with reference to a preferred, non-limiting embodiment of a machine as illustrated in the accompanying drawings, in which.

DESCRIPTION OF THE PREFERRED EMBODIMENTS

Figure 1:
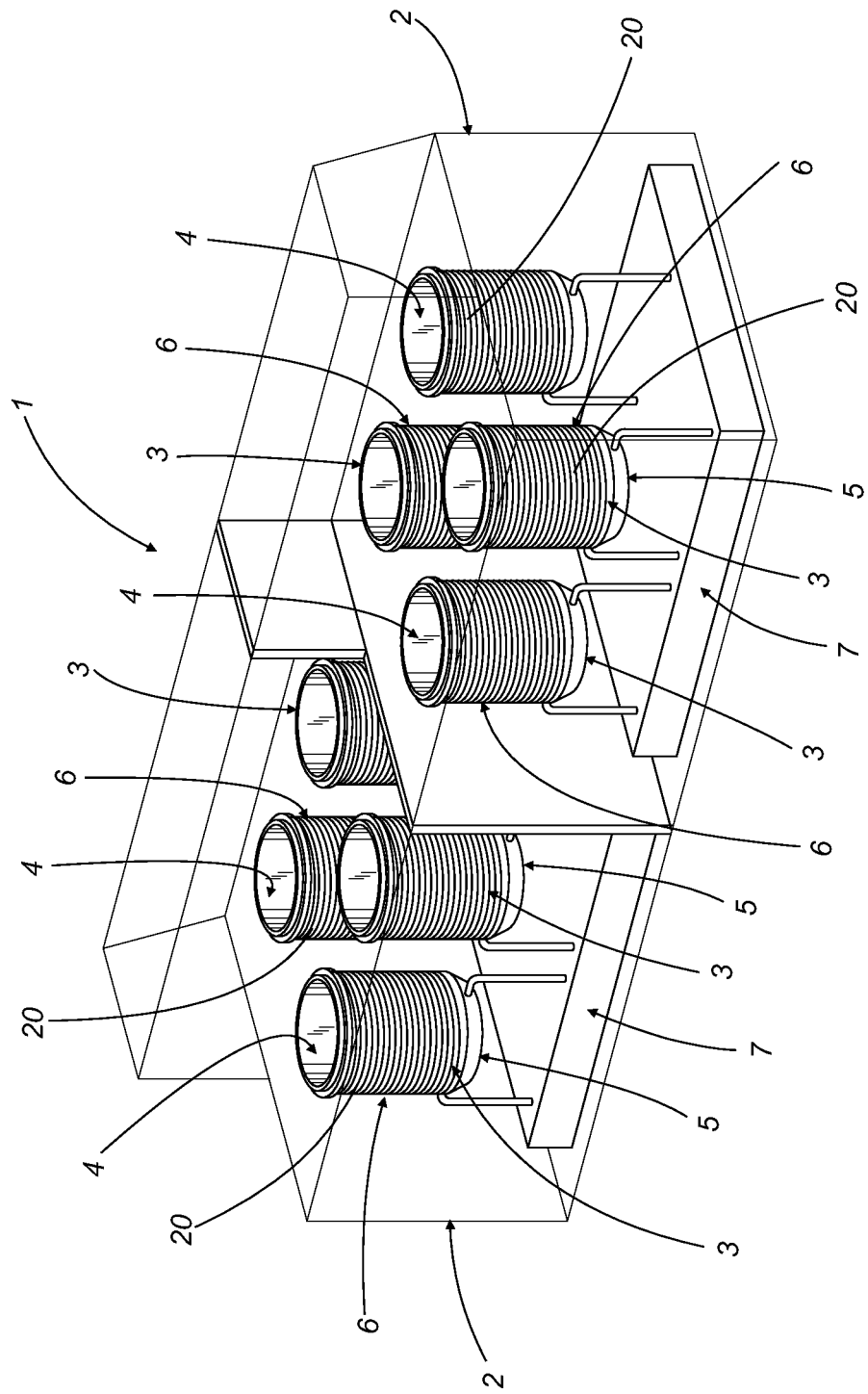
FIG. 1 is a schematic perspective view of a machine according to his invention.

As illustrated in FIG. 1, the numeral 1 denotes in its entirety a machine for processing and keeping ice cream, slush drinks and similar products, comprising a display counter 2 having a plurality of visible mixing and freezing cylinders 3 for processing and keeping basic products and ice cream, respectively.

Preferably, a display counter 2 comprises four mixing and freezing cylinders 3.

The display counters 2 may also be placed side by side to have a larger number of mixing and freezing cylinders 3, depending on the number of display counters 2 placed side by side.

For example, FIG. 1 shows two display counters 2 side by side, each having four mixing and freezing cylinders 3, making a single display counter with eight mixing and freezing cylinders 3.

Each mixing and freezing cylinder 3 has an access opening 4, a bottom wall 5 and side walls 6.

The mixing and freezing cylinders 3 are positioned in the display counter 2 with their axes of longitudinal extension substantially vertical. That way, the access opening 4 of each mixing and freezing cylinder 3 is located in the upper portion of the display counter 2, allowing the operator to easily add the basic products and extract the ice cream.

Preferably, each access opening 4 is provided with a lid, in particular a transparent one, not illustrated.

The machine 1 comprises a cooling circuit 7 mounted inside the display counter 2.

The cooling circuit 7 is designed to adjust the temperature of the products inside each of the mixing and freezing cylinders 3, whether they are the basic products to be processed or the ice cream to be stored.

Figure 2:
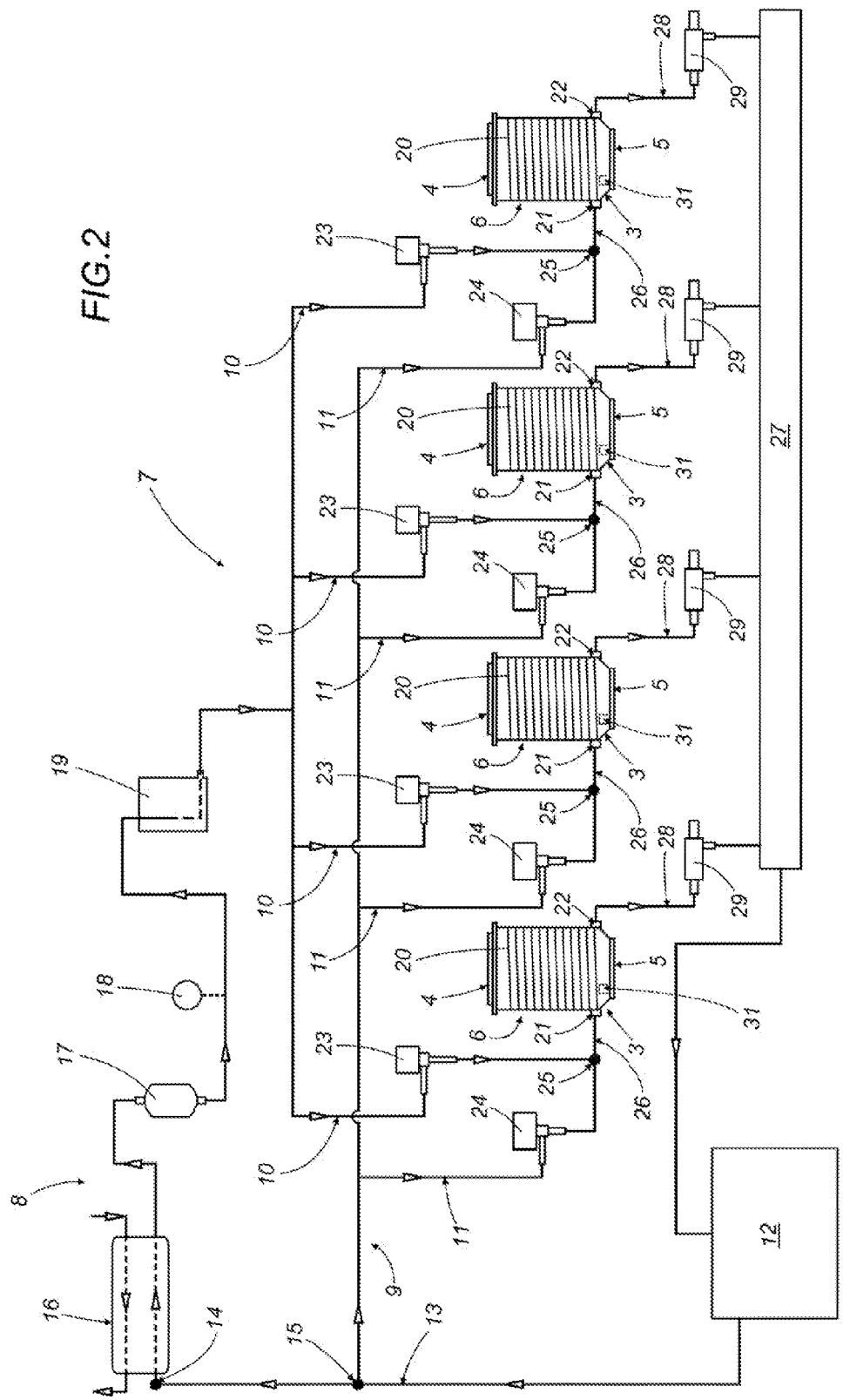
FIG. 2 shows in a schematic view a cooling circuit of the machine according to the invention.

The cooling circuit 7 comprises a first refrigerating circuit 8 and a second heating circuit 9, as shown in FIG. 2.

More specifically, the cooling circuit 7 thus defined can also work as a heat pump.

Advantageously, the fluid circulating in the cooling circuit 7 is a single refrigerant used both for the first refrigerating circuit 8 and for the second heating circuit 9.

More specifically, the refrigerant circulating in the first refrigerating circuit 8 is a refrigerant in the cooled state, capable of absorbing heat from the mixing and freezing cylinders 3 and thus from the respective products inside them.

The refrigerant circulating in the second heating circuit 9 is a refrigerant in the heated state, capable of adding heat to the mixing and freezing cylinders 3 and thus to the respective products inside them.

The first refrigerating circuit 8 and the second heating circuit 9 each comprise respective offtake branches 10 and 11. The offtake branches 10 and 11 are service branches associated with each mixing and freezing cylinder 3.

More specifically, each mixing and freezing cylinder 3 is served by a respective offtake branch 10 of the first refrigerating circuit 8 and by a respective offtake branch 11 of the second heating circuit 9.

For each mixing and freezing cylinder 3, the offtake branches 10 and 11 meet at a point of intersection 25 from which a common infeed stretch 26 extends.

The cooling circuit 7 comprises a main branch 13 from which both the first refrigerating circuit 8 and the second heating circuit 9 extend.

More specifically, the main branch 13 comprises respective draw-off points 14 and 15 of the first refrigerating circuit 8 and of the second heating circuit 9. In other words, the first refrigerating circuit 8 and the second heating circuit 9 are fed by way of the main branch 13.

The cooling circuit 7 also comprises a compressor 12.

The main branch 13 extends from the compressor 12 in such a way that the first refrigerating circuit 8 and the second heating circuit 9 can draw compressed, heated refrigerant flowing out of the selfsame compressor 12.

Thus, in the second heating circuit 9, compressed, heated refrigerant can circulate and be drawn off at the draw-off point 15, while in the first refrigerating circuit 8, the compressed, heated refrigerant drawn off at the draw-off point 14 is then cooled and laminated to obtain cooled refrigerant.

To cool the compressed, heated refrigerant flowing out of the compressor 12, the first refrigerating circuit 8 comprises a heat exchanger 16 mounted downstream of the draw-off point 14.

Preferably, a filter 17 and an indicating device 18 are located downstream of the heat exchanger 16.

Further, the first refrigerating circuit 8 comprises a reservoir 19 for the cooled refrigerant fed out of the heat exchanger 16. The reservoir 19 is located downstream of the heat exchanger 16 and, more precisely, downstream of both the filter 17 and the indicating device 18.

The reservoir 19 is located upstream of each offtake branch 10 of the first refrigerating circuit 8.

More specifically, each offtake branch 10 comprises a respective laminating element 23. The laminating elements 23 are thus located downstream of the reservoir 19.

Preferably, the laminating element 23 is an electronic valve. Alternatively, the laminating element 23 may be a capillary or an automatic expansion valve.

Downstream of each laminating element 23, there is a coil 20 having its own inlet opening 21 and its own outlet opening 22. Each coil 20 is associated with a respective mixing and freezing cylinder 3.

Each mixing and freezing cylinder 3 has a coil 20 wound around it. More specifically, the coil 20 is wound around the side walls 6 of the mixing and freezing cylinder 3 along the axis of longitudinal extension of the mixing and freezing cylinder 3 itself.

During operation of the refrigerating circuit 7, the compressed, heated refrigerant flows from the draw-off point 14 of the first refrigerating circuit 8 and through the heat exchanger 16, transferring heat to an external fluid, such as, for example, water or air and, at the same time, condensate.

When the refrigerant flows out of the heat exchanger 16, its temperature is lower than its temperature when it flows into the heat exchanger 16.

The cooled refrigerant flowing out of the heat exchanger 16 is fed into the reservoir 19.

The cooled refrigerant that accumulates in the reservoir 19 is then fed into each of the offtake branches 10 and into the respective laminating elements 23.

The cooled refrigerant expands as it flows through the laminating element 23, so that its pressure flowing out of the laminating element 23 is lower than its pressure flowing in.

From the laminating element 23, the cooled, laminated refrigerant travels along the common infeed stretch 26 and is then fed by way of the inlet opening 21 into the coil 20 associated with a mixing and freezing cylinder 3.

As it travels along the coil 20, the cooled, laminated refrigerant absorbs the heat from the product contained in the respective mixing and freezing cylinder 3, and evaporates. After flowing through the entire coil 20, the evaporated refrigerant flows out of the coil by way of the outlet opening 22.

As regards the second heating circuit 9, each offtake branch 11 of each mixing and freezing cylinder 3 comprises a respective flow regulating unit 24.

Downstream of each flow regulating unit 24 is the coil 20 which is wound around its respective mixing and freezing cylinder 3.

During the operation of the refrigerating circuit 7, the compressed, heated refrigerant flows from the draw-off point 15 of the second heating circuit 9 directly into the offtake branches 11 and then into the respective flow regulating units 24.

From the flow regulating unit 24, the compressed, heated refrigerant travels along the common infeed stretch 26 and is then fed by way of the inlet opening 21 into the coil 20 associated with a mixing and freezing cylinder 3.

As it travels along the coil 20, the compressed, heated refrigerant transfers heat to the product contained in the respective mixing and freezing cylinder 3, and cools down.

After flowing through the entire coil 20, the refrigerant Bows out of e coil by way of the outlet opening 22.

From the above description it may be inferred that the laminating element 23 and the flow regulating unit 24, being mounted upstream of each coil 20, constitute means for isolating the respective offtake branches 10 and 11.

In effect, by shutting off the laminating element 23, it is possible to isolate each mixing and freezing cylinder 3 from the first refrigerating circuit 8, and by shutting off the flow regulating unit 24, it is possible to isolate each mixing and freezing cylinder 3 from the second heating circuit 9.

The cooling circuit 7 also comprises a collection tank 27. The collection tank 27 is located downstream of all the coils 20.

More specifically, a discharge branch 28 extends from each coil 20 and connects the coil to the collection tank 27.

Advantageously, to balance up the pressure of the refrigerant flowing out of each coil 20, each discharge branch 28 comprises a pressure regulator member 29. The pressure regulator member 29 is interposed between the outlet opening 22 of each coil 20 and the common collection tank 27.

Advantageously, the cooling circuit 7 described above can operate using a single compressor 12. More specifically, the compressor 12 compresses the refrigerant from the common collection tank 27 and feeds it into the main branch 13 at a high pressure and temperature.

Figure 3:
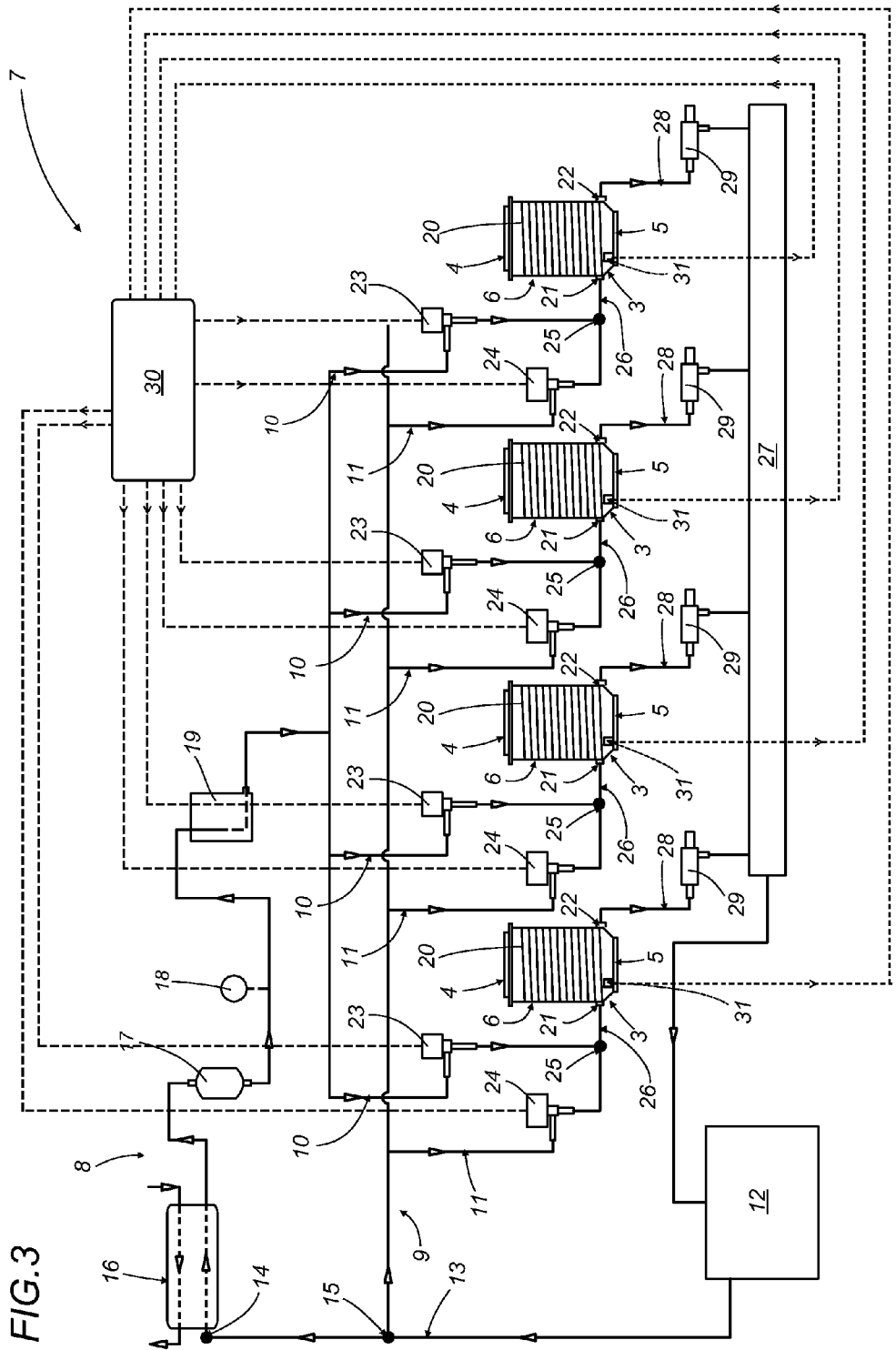
FIG. 3 shows in a schematic view the cooling circuit of FIG. 2 and a control unit designed to control the cooling unit.

As illustrated in FIG. 3, the machine 1 also comprises a control unit 30.

The control unit 30 controls the activation of the offtake branches 10 and 11 of the first refrigerating circuit 8 and of the second heating circuit 9, respectively, in such a way as to adjust the temperature of the products contained in the respective mixing and freezing cylinders 3.

The activation of the offtake branches 10 and 11 of each mixing and freezing cylinder 3 allows maintaining the temperature for processing the basic product at the same temperature for keeping the ice cream.

It should be noted that the temperature of the basic product during its processing, that is, during it transformation into the finished product to be dispensed to the consumer, varies until reaching a predetermined mixing and freezing temperature. It is important to specify that this mixing and freezing temperature, that is, the temperature reached after the basic product has been processed, is the same as the temperature for storing/keeping the finished product. In other words, once processing has ended with the step of mixing and freezing and the finished food product is ready to be sold, it can be stored and kept at the same temperature at which it was mixed and frozen and the product does not undergo further transformations due to temperature changes between mixing and freezing and storage.

This is possible because the control unit 30 activates the offtake branches 10 and 11 alternately.

Advantageously, keeping the final processing temperature (mixing and freezing temperature) of the basic product the same as the temperature for keeping the ice cream makes it possible to obtain a gelato with an excellent consistency compared to gelato made with prior art machines. Moreover, compared to prior art machines, there is no need for the step of reducing the bacterial charge which occurs at much lower temperatures than the processing temperature, thus allowing significant energy savings.

To adjust and maintain the temperatures for processing and keeping the products contained in each of the mixing and freezing cylinders 3, the control unit 30 acts on the means for isolating each mixing and freezing cylinder 3, that is to say, the control unit 30, acts on both the laminating elements 23 and on the flow regulator units 24.

That way, each mixing and freezing cylinder 3 is thermally independent of the others because the control unit 30 adjusts the temperature for processing the basic products and the temperature for keeping the ice cream in each mixing and freezing cylinder 3, by turning on and off the respective laminating element 23 and the respective flow regulator unit 24.

This configuration potentially allows processing the basic products in the mixing and freezing cylinders 3 where the ice cream is finished and, at the same, time storing the ice cream still present in the remaining mixing and freezing cylinders 3.

The control unit 30 is logically connected to the compressor 12 in such a way as to control the activation thereof.

More specifically, when keeping the ice cream, the control unit 30 activates the compressor 12 intermittently.

To be able to control the temperature of the products inside each mixing and freezing cylinder 3, the machine 1 comprises a temperature sensor 31 associated with each mixing and freezing cylinder 3.

Preferably, the temperature sensor 31 is in contact with the product contained in the respective mixing and freezing cylinder 3, that is to say, with the basic product or with the ice cream.

Alternatively, the temperature sensor 31 may be in contact with the side wall 6 or the bottom wall 5 of the respective mixing and freezing cylinder 3.

The control unit 30 is logically connected to the temperature sensors 31 of the mixing and freezing cylinders 3, in such a way as to adjust their temperatures as a function of the temperatures detected by the respective sensors 31.

Advantageously, the machine 1 comprises a cooling circuit 7 which is inexpensive and simple in construction.

A further advantage is due to the fact that each mixing and freezing cylinder 3 is thermally independent of the other mixing and freezing cylinders 3 present in the same display counter 2.

In particular, the control unit 30 allows maintaining the temperature for processing the basic product at the same temperature for keeping the ice cream, thereby improving the consistency of the artisanal gelato.

Alternatively, besides ice cream, the machine 1 is also capable of processing and storing cake and pastry fillings, such as custards, creams or similar products.

What is claimed is:

1. A machine for processing and keeping frozen food products, comprising:
    a display counter comprising a plurality of visible mixing and freezing cylinders for processing basic products and keeping frozen food products;
    each of the plurality of mixing and freezing cylinders including an access opening which allows introducing one of the basic products to be processed to obtain one of the frozen food products, and extracting the one of the frozen food products once processing is complete; and
    a cooling circuit setting a temperature of the one of the basic products and of the one of the frozen food products during the processing of the one of the basic products and the keeping of the one of the frozen food products, respectively, in a respective one of the plurality of mixing and freezing cylinders, the cooling circuit comprising a first refrigerating circuit and a second heating circuit;
    the first refrigerating circuit comprising respective offtake branches for each of the plurality of mixing and freezing cylinders and the second heating circuit comprising respective offtake branches for each of the plurality of mixing and freezing cylinders;
    a control unit alternately activating the respective offtake branches of the first refrigerating circuit and the second heating circuit of each of the plurality of mixing and freezing cylinders to set the temperatures for processing the basic products and set the temperatures for keeping the frozen food products, the temperature for processing the basic product being the same as the temperature for keeping the frozen food product for each of the plurality of mixing and freezing cylinders;
    a plurality of temperature sensors, one each for the plurality of mixing and freezing cylinders, sensing the temperatures of the products in each of the plurality of mixing and freezing cylinders;
    the control unit connected to each of the temperature sensors, and as a function of the temperatures sensed by the temperature sensors, alternately activating the respective offtake branches of the first refrigeration circuit and of the second heating circuit of each of the plurality of mixing and freezing cylinders independently from others of the plurality of mixing and freezing cylinders to set the temperature for processing the basic product and the temperature for keeping the frozen food product of each of the plurality of mixing and freezing cylinders independently from others of the plurality of mixing and freezing cylinders;
    wherein each of the plurality of mixing and freezing cylinders includes a heat transfer circuit having an inlet opening and an outlet opening, the inlet opening connecting to the respective offtake branches, the outlet opening connecting to a collection receptacle for recirculating refrigerant from the respective offtake branches;
    a pressure regulator member positioned between the outlet opening of each heat transfer circuit and the collection receptacle;
    wherein each offtake branch of the first refrigerating circuit includes a respective expansion element upstream of each heat transfer circuit;
    wherein each offtake branch of the second heating circuit comprises a respective flow regulating unit upstream of each heat transfer circuit;
    wherein the respective expansion element and the respective flow regulating unit isolate the respective branches, the control unit controlling the respective expansion element and the respective flow regulating unit to set the temperature of each of the plurality of mixing and freezing cylinders.

2. The machine according to claim 1, wherein the cooling circuit comprises at least one compressor and a main branch, positioned downstream of the compressor, comprising draw-off points of the first refrigerating circuit and of the second heating circuit, respectively.

3. The machine according to claim 2, wherein each heat transfer circuit includes a coil wrapped around the respective mixing and freezing cylinder, the coil connecting between the inlet opening and the outlet opening.

4. The machine according to claim 3, wherein the offtake branches of each mixing and freezing cylinder have a point of intersection from which extends a common infeed stretch which is connected to the inlet opening of the respective coil.

5. The machine according to claim 3, wherein the collection receptacle includes a common collection tank located downstream of the coils of the mixing and freezing cylinders; a discharge branch connecting the outlet opening of each coil to the collection tank.

6. The machine according to claim 5, wherein the cooling circuit comprises a single compressor compressing the refrigerant from the common collection tank and feeding the refrigerant into the main branch at a high pressure and temperature.

* * * * *